United States Patent [19]
Boxall

[11] 4,203,012
[45] May 13, 1980

[54] HYBRID CIRCUIT USING CURRENT MIRROR CIRCUITS

[76] Inventor: Frank S. Boxall, 380 Eleanor Dr., Woodside, Calif. 94062

[21] Appl. No.: 923,365

[22] Filed: Jul. 10, 1978

Related U.S. Application Data

[63] Continuation-in-part of Ser. No. 815,769, Jul. 14, 1977, abandoned.

[51] Int. Cl.² ............................................. H04B 1/58
[52] U.S. Cl. ........................... 179/170 NC; 179/170 T
[58] Field of Search ......... 179/170 R, 170 T, 170 NC

[56] References Cited

U.S. PATENT DOCUMENTS

| | | | |
|---|---|---|---|
| 3,849,609 | 11/1974 | Voorman | 179/170 NC |
| 4,004,109 | 1/1977 | Boxall | 179/170 NC |
| 4,041,252 | 8/1977 | Cowden | 179/170 NC |

*Primary Examiner*—Bernard Konick
*Assistant Examiner*—Randall P. Myers

[57] ABSTRACT

A direct coupled transformerless hybrid for providing signal conversion between a balanced bidirectional transmission path and separate incoming and outgoing unidirectional transmission paths, for providing direct current to the bidirectional transmission path, for suppressing longitudinal mode signals originating in the bidirectional transmission path, and for providing signal balance to suppress transmission of reflected echoes from the incoming unidirectional transmission path to the outgoing unidirectional transmission path.

24 Claims, 16 Drawing Figures

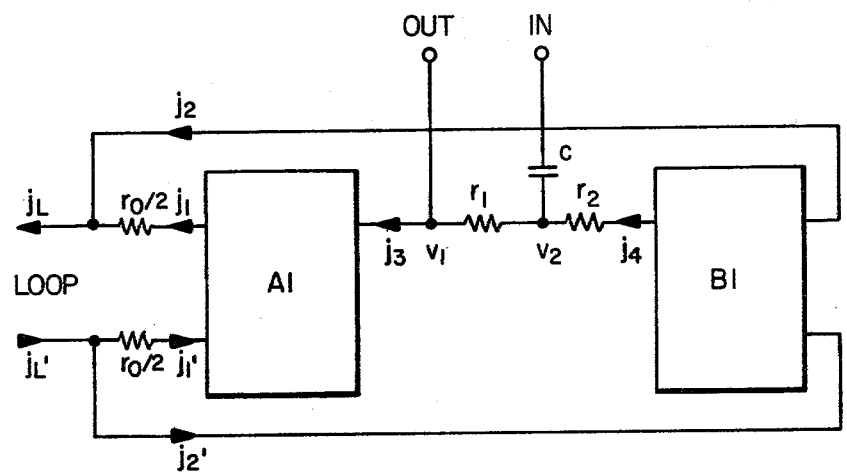
FIG_7
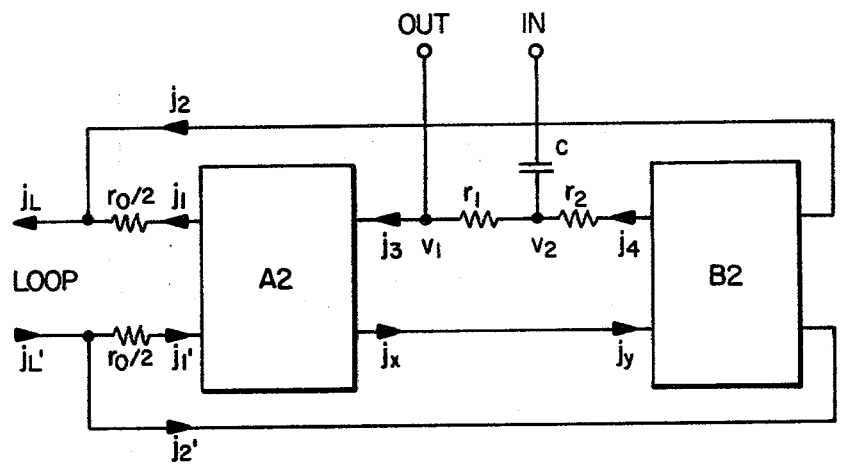
FIG_8
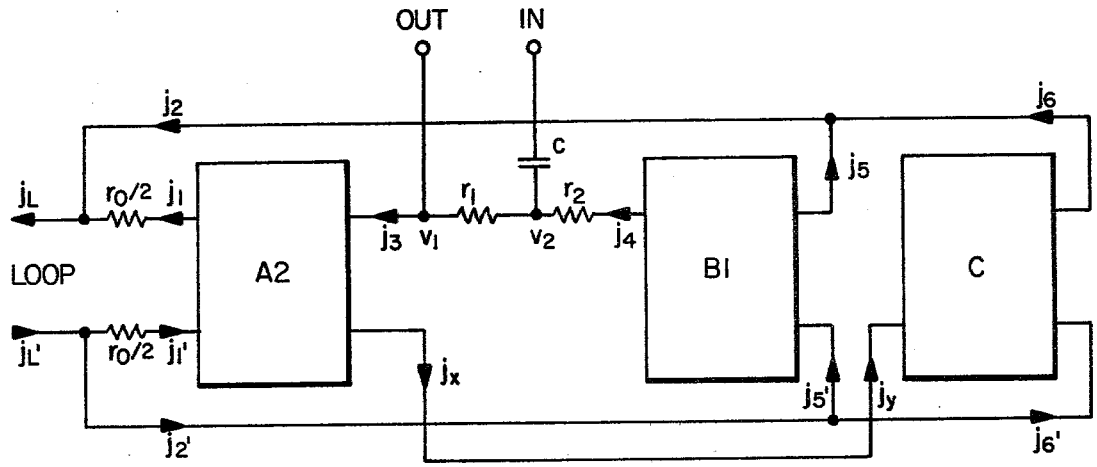
FIG_9

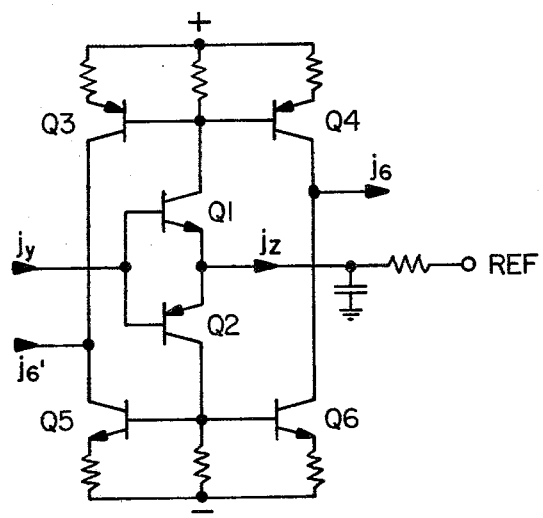
FIG_10
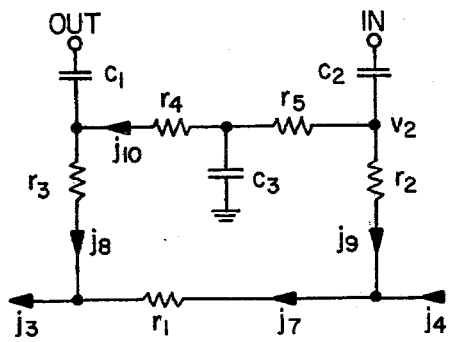
FIG_11
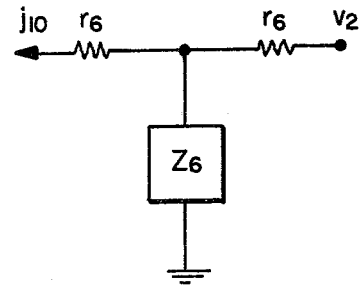
FIG_12
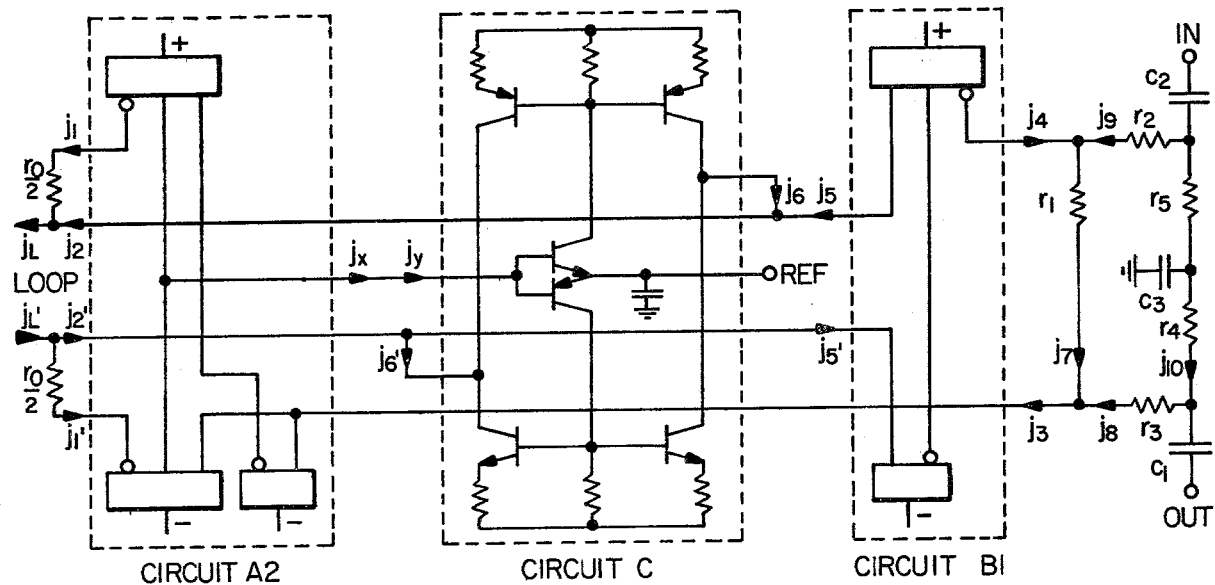
FIG_13

HYBRID CIRCUIT USING CURRENT MIRROR CIRCUITS

RELATED APPLICATIONS

This application is a continuation-in-part of copending application Ser. No. 815,769, filed July 14, 1977, entitled "HYBRID CIRCUIT" now abandoned.

BACKGROUND OF THE INVENTION

This invention relates to hybrid circuits for providing an interface between a pair of unbalanced unidirectional transmission paths and a balanced two-wire, bidirectional transmission path. More particularly this invention relates to hybrid circuits of such type which are direct coupled, i.e. transformerless.

Hybrid circuits are known for providing signal conversion between a balanced two-wire, bidirectional transmission path and a pair of unbalanced unidirectional transmission paths, the latter comprising a first unidirectional transmission path for carrying incoming electrical signals and a second unidirectional transmission path for carrying outgoing electrical signals. Such hybrid circuits are typically employed in the telephone art to provide a signal interface between a telephone carrier channel having the aforementioned pair of unidirectional transmission paths and the balanced bidirectional transmission paths at either end of the carrier channel to which are connected the subscriber loop and the telephone instrument at one end and the central office equipment at the other end.

In the past, hybrid circuits have been conventionally implemented by means of transformers having a pair of loop terminals connected to the bidirectional signal path and terminals connected to the separate incoming and outgoing unidirectional signal paths.

Due to limitations inherent in transformer type hybrids, recent efforts have been directed to the design of transformerless hybrid circuits having substantially similar functional capability as the transformer type hybrids. State of the art hybrids of this type, of which the disclosure of U.S. Pat. No. 3,849,609 is representative, employ semiconductor current controlled current sources hereinafter designated "current mirrors" to convert incoming signals from one unidirectional transmission path to balanced signals on the bidirectional transmission path and to convert balanced signals originating in the bidirectional transmission path to outgoing signals on the other unidirectional transmission path. Circuits of this type possess the decided advantage of being implementable as integrated circuits. This results in lower manufacturing costs than for the transformer type hybrids, together with good reliability and small physical size.

In U.S. Pat. No. 4,004,109 there is described a transformerless hybrid for providing signal conversion between a balanced bidirectional transmission path and two unidirectional transmission paths, for suppressing longitudinal (common mode) signals originating in the bidirectional transmission path and for providing signal balance to suppress transmission of reflected echoes from the incoming unidirectional transmission path to the outgoing unidirectional transmission path.

Of the several embodiments disclosed in said patent, each includes a plurality of current mirror circuits, some of which are of complimentary conductivity type to the remaining current mirror circuits. Each current mirror circuit has a common terminal, one input terminal, at least one output terminal, and means for supplying currents to the output terminals which are proportional to the current at the input terminal.

SUMMARY AND OBJECTS OF THE INVENTION

It is a general object of the present invention to provide an improved hybrid circuit employing current mirrors.

It is another object to provide a hybrid circuit which can be manufactured at relatively low cost, is reliable in operation, small in physical size and provides direct current to the bidirectional transmission path, suppression of longitudinal signals originating in the bidirectional path, signal balance for suppressing reflected echoes, optimum conversion between unbalanced signals at the unidirectional signal paths and balanced signals at the bidirectional path side and improved frequency response over the bandwidth of the signal transmission system in which the hybrid is employed.

It is a further object of the invention to provide an integrated hybrid circuit which is easily manufactured, may include limiting means for reducing the power drain, provides improved longitudinal signal suppression, and substantially increases the magnitude of longitudinal loop currents which can be suppressed.

It is a further object of the invention to provide a hybrid circuit which can accommodate longitudinal loop currents whose peak value exceeds the direct loop current.

It is still another object of the present invention to provide a hybrid circuit having high impedance loop side terminating resistors.

It is still a further object of the present invention to provide a hybrid circuit in which the voltage gain from input to loop conforms to that for conventional transformer type hybrids and is dependent of the balance impedance of the hybrid.

The improved features offered by the hybrid circuit of the present invention are achieved in a hybrid circuit which provides signal transmission between a balanced bidirectional signal path and a pair of unidirectional signal paths including means for converting signals incoming on the bidirectional signal path to signals on the outgoing unidirectional signal path, means for converting signals on the incoming unidirectional signal path to signals outgoing on the bidirectional signal path, means for suppressing the transmission of common mode signals incoming on the bidirectional signal path to the outgoing unidirectional signal path, means for suppressing the transmission of signals from the incoming to the outgoing unidirectional signal path, means providing a hybrid impedance $Z_0$ to normal mode signals incoming on the bidirectional signal path including impedances having one terminal connected to one side of the bidirectional signal path, means providing a direct current to said bidirectional signal path comprised of two components, one supplied through said impedances and the other from current controlled current sources, and means for maintaining said two components of direct current in constant proportion to one another independent of the direct current resistance of the bidirectional signal path.

BRIEF DESCRIPTION OF FIGURES

FIG. 7 is the hybrid circuit shown in FIG. 3 with components grouped into blocks A1 and B1 plus external components.

FIG. 8 is the hybrid circuit shown in FIG. 4 with components grouped into blocks A2 and B2 plus external components.

FIG. 9 shows a transformerless hybrid circuit in accordance with another embodiment of the invention.

FIG. 10 is a schematic diagram of one of the circuit blocks shown in FIG. 9.

FIG. 11 is another input-output network which may be used in FIGS. 7, 8 or 9.

FIG. 12 shows another balance network which may be used in FIG. 11.

FIG. 13 is a schematic diagram of the hybrid circuit of FIG. 9 using the input-output network of FIG. 11.

DESCRIPTION OF PREFERRED EMBODIMENTS

Figure 1:
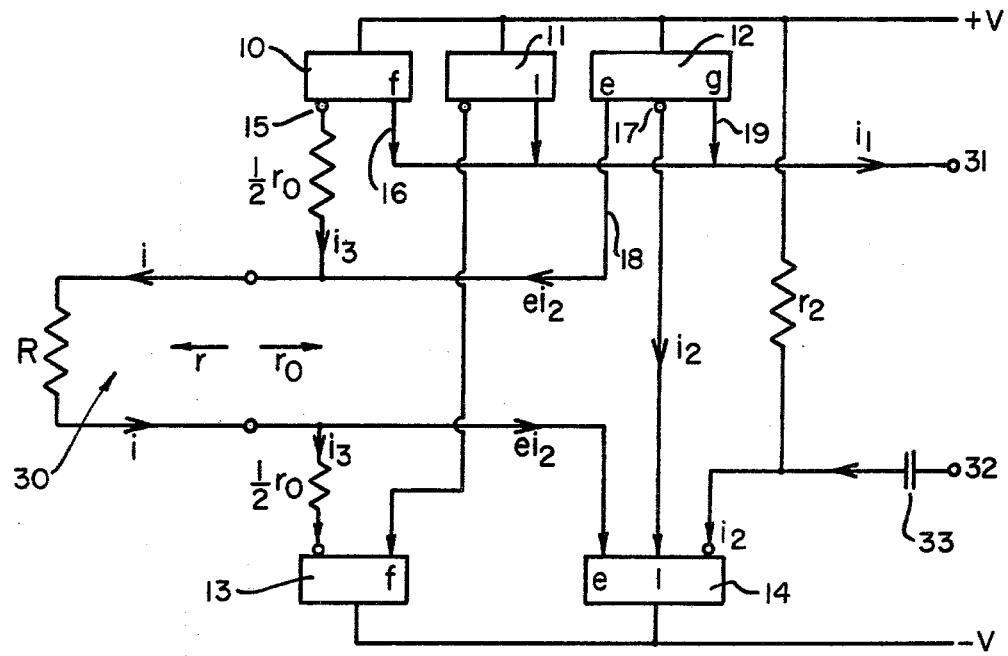
FIG. 1 is a circuit diagram of a transformerless hybrid circuit in accordance with my U.S. Pat. No. 4,004,109.

FIG. 1 illustrates an embodiment of a hybrid according to my U.S. Pat. No. 4,004,109. As seen in this figure, the hybrid includes a plurality of current mirror circuits 10, 11 and 12 of one conductivity type and a plurality of current mirror circuits 13 and 14 of complementary conductivity type. Each current mirror circuit has an input terminal designated by a small circle as shown, one or more output terminals which can be identified by alphanumeric characters, and a common terminal.

Each current mirror functions in such a manner that the current present at the output terminal is proportional to the input current. The proportionality is designated by an alphanumeric character which may be an integral, fractional or irrational numeric quantity. For example, with the current present at input terminal 15 of current mirror 10 represented by $i_3$ the output current present at output terminal 16 equals $fi_3$, where f is a predetermined numeric quantity. Similarly, with current $i_2$ present at the input terminal 17 of current mirror 12 the current present on output terminal 18 equals $ei_2$ while the current present on output terminal 19 equals $gi_2$ where e and g are both predetermined numeric quantities. The sense of the arrow adjacent the input terminal circle indicates the direction of current flow through a given current mirror circuit and thus the conductivity type. An arrow pointing away from the input terminal designates a PNP type current mirror and an arrow pointing towards the input terminal designates a NPN type current mirror. In FIG. 1 current mirrors 10, 11 and 12 are of PNP type while current mirrors 13 and 14 are of NPN type. These conventions are used throughout the figures in the following description.

Figure 2A:
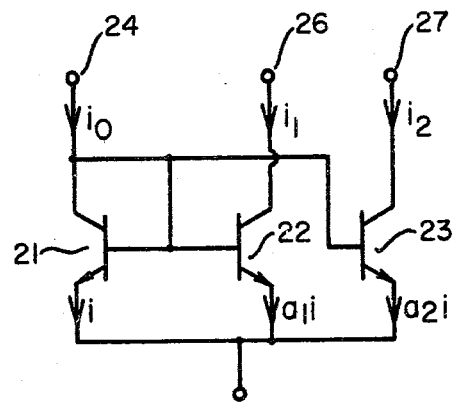
FIGS. 2A-2D are circuit diagrams illustrating current mirrors such as might be employed in the present invention.

FIG. 2A is a circuit diagram showing one means of implementing an NPN type current mirror. As shown in this figure, the current mirror comprises a diode connected input transistor 21 which provides a relatively low input impedance and a plurality of output transistors 22 and 23 having their bases connected to the base of input transistor 21. The emitters of the transistors 21, 22 and 23 are connected together. Since the collector currents of transistors 22 and 23 are independent of collector voltage, these elements provide relatively high output impedance.

Because transistors 21-23 have the same base-emitter voltage, the respective emitter currents are proportional to the relative areas of the respective base-emitter junctions, where the area of transistor 21 is taken as unit area. Ignoring small base currents $i_0=i$, $i_1=a_1 i_0$, $i_2=a_2 i_0$ where $a_1$, $a_2$ are the relative areas of the base-emitter junctions of the transistors 22 and 23 respectively.

Figure 2B:
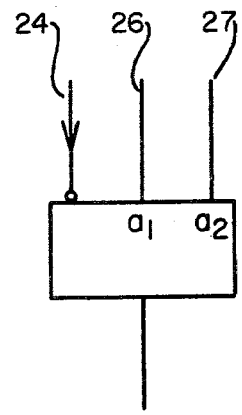

It should be noted that the current mirror operates as described only if the instantaneous input current is in the direction indicated and the output voltages do not saturate the output transistors 22 and 23. FIG. 2B is a convenient circuit symbol for the current mirror circuit of FIG. 2A. Input terminal 24 is designated by a small circle adjacent to the block outline. Output terminals 26 and 27 are identified by characters $a_1$, $a_2$ respectively, indicating the proportionality of the respective output currents to the input current.

Figure 2C:
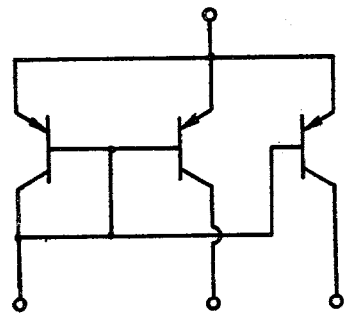
Figure 2D:
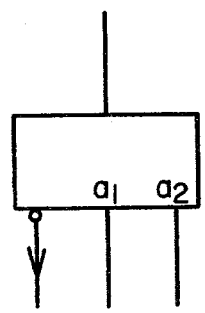

FIGS. 2C and 2D illustrate respectively, the circuit diagram of a PNP current mirror circuit and the corresponding circuit symbol as employed in this disclosure.

The several transistors of the embodiments of FIGS. 2A and 2C can preferably be fabricated by simultaneous diffusion into a single monolithic semiconductor substrate. They can, therefore, be very closely matched.

Other embodiments of NPN and PNP current mirror circuit are known. For example, resistors inserted in series with each of the emitter leads will improve the accuracy of the current ratios. The circuit symbols of FIGS. 2B and 2D as used in the hybrid circuits of FIGS. 1, 3 and 4 may represent any appropriate embodiment of the respective current mirrors and are not necessarily limited to the embodiments of FIGS. 2A and 2C.

Referring now to the circuit of FIG. 1, described in detail in my said U.S. Pat. No. 4,004,109, the hybrid circuit provides direct current (talking battery) to a telephone instrument connected to the far end of the two-wire loop 30. The DC resistance of the loop and telephone instrument are represented by R, and the signal impedance by r. The impedance of the hybrid is $r_0$, determined by the two terminating resistors, each of value $r_0/2$. This hybrid provides signal transmission from loop 30 to outgoing unidirectional terminal 31; it provides signal transmission from incoming unidirectional terminal 32 to the loop 30; it suppresses signal transmission from terminal 32 to terminal 31; and it suppresses transmission of longitudinal signals from loop 30 to terminal 31. Longitudinal (common mode) signals are currents which flow in the same direction in each of the two loop conductors as opposed to metallic (normal mode) signals which are currents which flow in the opposite direction in each of the two loop conductors. Metallic loop signals arise from the normal functioning of the telephone instrument transmitter. Longitudinal loop signals arise from crosstalk into the loop conductors from adjacent loops or by power induction from nearby power distribution circuits or power currents flowing in the metallic sheath of multipair telephone cable.

The loop current i is composed of two components: $i_3$ which is supplied from the input terminals of current mirrors 10 and 13 through the terminating resistors and $ei_2$ which is supplied from the output terminals of current mirrors 12 and 14. The portion $ei_2$ is a constant portion determined by the DC current flowing in $r_2$. The portion $i_3$ is determined by the loop resistance R.

$$i_3 = \frac{v - ei_2 R}{R + r_0}$$

where v is the voltage between the input terminals of current mirrors 10 and 13 (i.e. the supply voltage less the small voltage drops, approximately one volt each, through the input circuits of 10 and 13). For long loops (large R) $i_3$ is much smaller than $ei_2$. For short loops (small R) $i_3$ may be excessively large. Signal transmission through the hybrid is by means of small signals variations superimposed on the DC currents.

In FIG. 1 metallic signal currents originating in the loop vary i and cause the input current $i_3$ of current mirrors 10 and 13 to vary in the same direction (both increase or both decrease), but longitudinal currents originating in the loop cause the input currents of current mirrors 10 and 13 to vary in opposite directions. Neither the metallic nor longitudinal currents can flow to the output terminals of current mirrors 12 and 14 because these have very high output impedance. The output of 13 drives 11 and the output of 11 is added to the output of 10. In this process the metallic currents add together but the longitudinal currents cancel one another. Therefore, assuming good match between current mirrors, no longitudinal signals appear in the output current $i_1$. The current gain of the hybrid from metallic loop current i to outgoing signal current $i_1$ is 2f.

This method of longitudinal suppression operates successfully so long as the total instantaneous current $i_3$ does not reverse its direction. However, if the magnitude of the longitudinal current is sufficient to reverse the direction of current $i_3$, then the current mirrors cease to function properly and the hybrid fails to suppress the longitudinal. This is a limitation of the hybrid shown in FIG. 1. As noted above, for long loops $i_3$ is much smaller than $ei_2$.

To complete the description of FIG. 1, signal currents from incoming signal terminal 32 pass through condenser 33 and vary the input current $i_2$ to current mirror 14. One output of 14 drives 12. One output of 12 and a second output of 14 apply the received signal to the loop. A portion of this signal flows through the terminating resistors into the input terminals of current mirrors 10 and 13 and would create "reflected echo" in the outgoing signal $i_1$. However a second output of 12 is added to $i_1$ in correct amplitude and phase to cancel the reflected echo. The degree of cancellation depends on the match between the loop impedance r and the hybrid impedance $r_0$. The loop and hybrid are matched when $r = r_0$. Nominally, $r = r_0$. For this condition the reflected echo is completely cancelled provided that the current mirror gains satisfy the relationship $ef = g$. The current gain of the hybrid from incoming signal current $i_2$ to signal current i in a matched loop is e/2.

Figure 3:
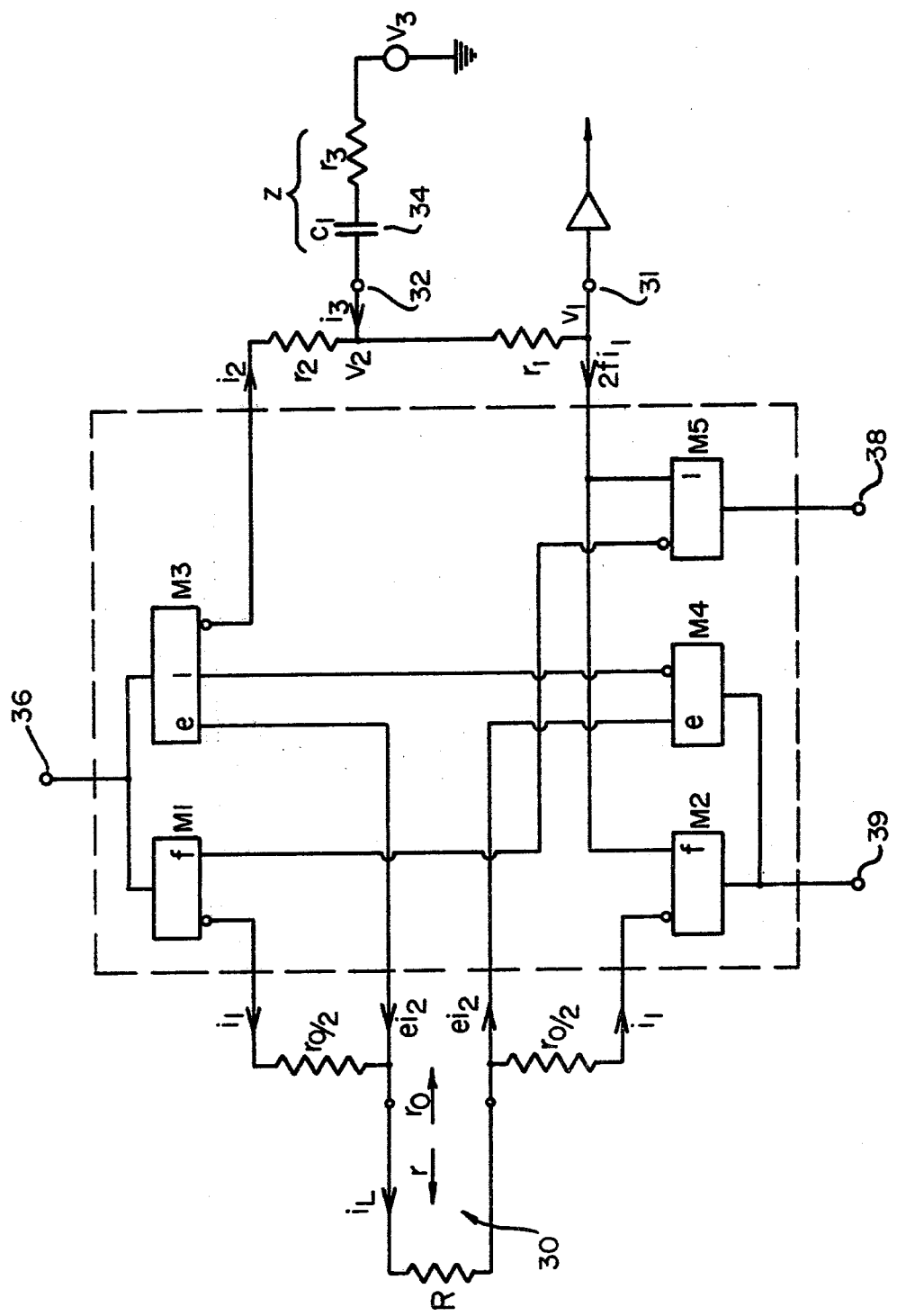
FIG. 3 shows a transformerless hybrid circuit in accordance with one embodiment of the present invention.

The hybrid of this invention is shown in FIG. 3. In contrast to FIG. 1, this hybrid maintains a constant proportionality between the two components of loop currents, $i_1$ and $ei_2$ (which correspond to $i_3$ and $ei_2$ of FIG. 1). Additionally, the hybrid may include an optional current limiting circuit described in connection with FIG. 6 which limits to reasonable values the current supplied to short subscriber loops. The latter reduces the power drain in short loop applications and also provides short circuit protection. The hybrid includes current mirrors M1 and M3 of one conductivity type and M2, M4, and M5 of complimentary type.

In FIG. 3 terminals 31 and 32 are the unidirectional outgoing and incoming signal terminals respectively. Terminal 31 is connected to an output amplifier of very high input impedance, e.g. a "voltage follower". Voltage $V_3$ and resistors $r_3$ represent the source of incoming signals coupled to terminal 32 through capacitor 34. Terminal 36 is connected to the positive terminal and terminals 38 and 39 are connected to the negative terminal of a DC power source.

The loop current $i_L$ in loop 30 is composed of two components: $i_1$ which flows from the input terminal of current mirror M1 through the upper terminating resistor ($r_0/2$), through the loop 30, through the lower terminating resistor ($r_0/2$), to the input terminal of current mirror M2; and $ei_2$ which flows from one output terminal of current mirror M3 through the loop to the output terminal of current mirror M4. The input current to current mirror M3 is $i_2$. It is repeated by a second output of current mirror M3 to the input terminal of current mirror M4. The total loop current is $$i_L = i_1 + ei_2$$

The output currents of M1 and M2 are each $fi_1$. The output of current mirror M1 is repeated through current mirror M5 and added to the output of M2. Therefore the current through $r_1$ is $2fi_1$.

To obtain the DC bias conditions we assume no signal incoming to terminal 32, (i.e. $V_3 = 0$) and no variation of loop current due to speech activity at the subscribers handset. Under these conditions $i_3 = 0$ and $i_L$ is constant. Therefore $$i_2 = 2fi_1, \text{ and } i_L = i_1(1 + 2ef)$$

Also $$i_1 r_0 + R i_L = v$$

where v is the DC voltage between the input terminals of M1 and M2. Thus $$i_L = \frac{v}{R + \frac{r_0}{1 + 2ef}}$$

To minimize total current drain from the DC power supply it is desirable to make f small and e large. It is also desirable, as will be shown, to proportion the DC components of $i_L$ such that $ei_2$ is about double $i_1$. This will be the case if $ef = 1$, i.e. $ei_2 = 2efi_1 = 2i_1$ in which case $$i_L = \frac{v}{R + r_0/3}$$

For illustrative purposes one might choose $f = 0.1$, $e = 10$.

We now consider transmission through the hybrid. Assume a normal mode (or metallic) current $i_x$ superimposed on the DC loop current. The current $i_x$ is caused by speech activity at the telephone instrument. Because M3 and M4 have very high output impedance, all of $i_x$ flows through the two terminating resistors ($r_0/2$) and the input terminals of M1 and M2. The output current of M1 is repeated through M5 and added to the output of M2. Thus the signal current in $r_1$ is $2fi_x$. The signal current in $r_2$ is $2fi_xz/r_2$ where z is the output impedance of the signal source connected to terminal 32. If z is much smaller than $r_2$ the signal current passed to the input of M3 via $r_2$ is negligible and $i_2$ remains constant. The signal voltage at output terminal 31 is $v_1 = 2fi_xr_1$ and the "trans-impedance" of the hybrid from loop signal current $i_x$ to output signal voltage $v_1$ is $2fr_1$.

Now assume a common mode or longitudinal current $i_c$ in the loop. Current $i_c$ flows in the same direction in the two loop conductors, whereas $i_x$ flowed in opposite directions in the two loop conductors. Thus $i_c$ entering M1 is in the opposite phase to $i_c$ entering M2. When these currents are combined at the output of M5 they subtract so that only a small difference current flows in $r_1$. Thus the degree of common mode suppression depends on the precision with which the two paths M1, M5 versus M2 are matched to one another.

Now consider transmission of an incoming signal from terminal 32 to the loop. Let the signal variation of $V_3$ cause a signal current $i_y$ to flow in $r_2$. Then the signal voltage at input terminal 32 is $v_2 = i_yr_2$. $i_y$ entering M3 causes the output currents of M3 and M4 to be $ei_y$. This current divides into two portions depending on the signal impedance r of the loop and the terminating resistance $r_0$. The portion which flows through the loop is $ei_yr_0/(r+r_0)$ and the portion which flows through the terminating resistors is $ei_yr/(r+r_0)$. This latter portion flows through the input terminals of M1 and M2 and creates a signal current in $r_1$ of $2efi_yr/(r+r_0)$. Note that the phase of the signal current in $r_1$ is opposite to that in $r_2$. That is, if instantaneous $i_y$ caused an increase in $i_2$ then $ei_2$ increases and $i_L$ increases but $i_1$ decreases and $2fi_1$ (in $r_1$) decreases. Thus the signal voltage across $r_1$ is in opposite phase to that across $r_2$, so the signal voltage $v_1$ at output terminal 31 is $$v_1 = v_2 - \frac{2efr}{r+r_0}r_1i_y = i_y(r_2 - 2efr_1\frac{r}{r+r_0})$$

For signal balance, (no reflected echo from input terminal 32 to output terminal 31) to a matched loop, ($r=r_0$) the value of $r_2$ should be $efr_1$. For this value of $r_2$ $$v_1 = i_yr_2(1 - \frac{2r}{r+r_0}) = v_2(\frac{r_0-r}{r_0+r}) = \rho v_2$$

where $$\rho = (\frac{r_0-r}{r_0+r})$$

is the reflection coefficient of the loop. Thus, as in a conventional hybrid, the reflected echo signal is proportional to the reflection coefficient between the hybrid impedance and the loop impedance.

For a matched loop (i.e. $r=r_0$) the signal current in the loop is $ei_y/2$ and the "transconductance" of the hybrid from input voltage $v_2$ to loop signal current is $$\frac{ei_y}{2v_2} = \frac{e_y}{2r_2} = \frac{e}{2efr_1} = \frac{1}{2fr_1}$$

which is simply the inverse of the transimpedance from the loop to output terminal 31. The total signal input current to terminal 32 is $$i_3 = i_y + 2efi_y\frac{r}{r+r_0} = i_y(1 + 2ef\frac{r}{r+r_0})$$

and the input impedance of terminal 32 is $$\frac{v_2}{i_3} = \frac{r_2}{1 + 2ef\frac{r}{r+r_0}}.$$

For a matched loop $i_3=(1+ef)i_y$ and the input impedance at terminal 32 is $(r_2/1+ef)$. From the foregoing we see that for transmission to a matched loop only half of the signal current in $ei_2$ is delivered to the loop. Conversely for transmission from the loop all of the signal current flows in $i_1$. Therefore for equal maximum signals to or from the loop it is desirable to proportion the DC bias currents such that $ei_2=2i_1$. This is the reason for choosing $ef=1$.

In the foregoing description of transmission of loop signal current $i_x$ to terminal 31 we postulated z much smaller than $r_2$ so that $i_2$ remained constant. If z is not small a signal current of $2fi_xz/r_2$ flows through $r_2$ into M3 and causes a signal current of $2efi_xz/r_2$ to flow from the output terminals of M3 and M4 to the loop. Then the loop current must be $i_x(1+2efz/r_2)$ rather than $i_x$ and the hybrid impedance is $r_0/(1+2efz/r_2)$ rather than $r_0$. In addition, a larger value of z introduces some signal attenuation between source $v_3$ and terminal 32 of the hybrid. These effects will be more evident at low frequencies because the impedance z includes series capacitor 34. Therefore hybrid terminal 32 should be driven from a low impedance source, and the value of capacitor 34 should be chosen for satisfactory operation at the lowest frequencies of interest. The high frequency limitations of the hybrid will be those of the current mirror circuits. In conventional transformer hybrids the low frequency and high performance are limited by the characteristics of the transformers employed therein.

In addition to the transmission functions described above, the hybrid may be required to provide a logic signal which indicates whether the subscriber loop is open or closed. This logic signal indicates whether the subscriber handset is on-hook or off-hook and also repeats subscriber dialing information toward appropriate control equipment. The logic signal can be derived in a variety of ways, e.g. by sensing the presence or absence of current in the common lead of M5. This current flows through terminal 38 and has the value $2fi_1$. The sensing element may be the input circuit of an optoisolator or alternatively, it might be a resistor which provides base voltage to switch a logic transistor on or off depending on the presence or absence of current. The sensing element will increase the input impedance of M5 but that is of no consequence because the input current to M5 is from the high impedance output of M1.

Figure 4:
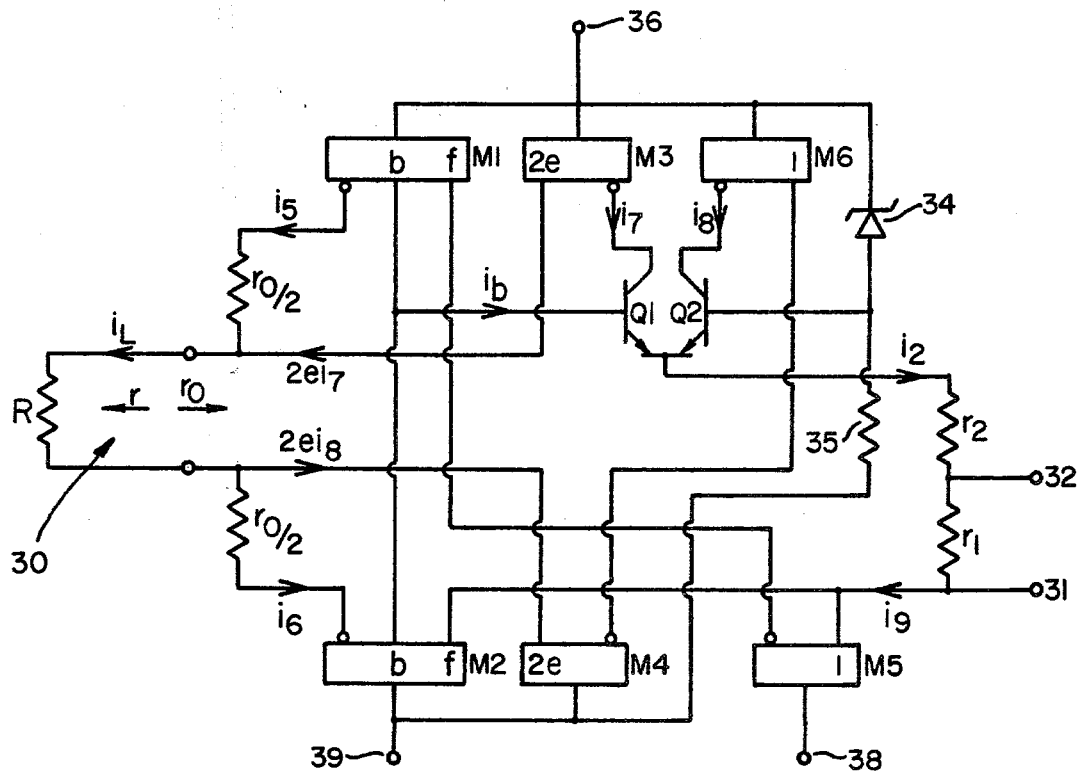
FIG. 4 shows a transformerless hybrid circuit in accordance with another embodiment of the invention.

FIG. 4 shows another hybrid in accordance with the present invention. Corresponding terminals are so indicated and it will be demonstrated that the currents shown in FIG. 4 are equal to corresponding currents in FIG. 3. The operation of the two circuits is similar except that the hybrid of FIG. 4 provides improved suppression of the transmission of common mode currents from loop 30 to terminal 31.

In FIG. 4 the input currents of M1 and M2 are $i_5$ and $i_6$ respectively and the output currents of M3 and M4 are $2ei_7$ and $2ei_8$ respectively. The loop current is $$i_L = i_5 + 2ei_7 = i_6 + 2ei_8$$

Therefore $$i_5 - i_6 = 2e(i_8 - i_7)$$

Transistors Q1 and Q2 are a differential pair with common emitter current $i_2$ and collector currents $i_7$ and $i_8$ which drive current mirrors M3 and M6.

$$i_7 + i_8 = i_2$$

M6 drives M4. The current gains of M3 and M6 are each $2e$. The base of Q2 is biased by a DC voltage supplied by a zener diode 34 and resistor 35. The base current of Q1 is supplied by second outputs of M1 and M2 such that $$i_b = b(i_5 - i_6)$$

where b is a small fraction.

This arrangement forces $i_5 = i_6$ and $i_7 = i_8$ by the following mechanism. Suppose that $i_b$ increases by $i_z$. Then $i_7$ increases and $i_8$ decreases by $\beta i_z$ where $\beta$ is the current gain of Q1. Then $i_8 - i_7$ decreases by $2\beta i_z$ and $i_5 - i_6$ decreases by $4e\beta i_z$ and $i_b$ decreases by $4be\beta i_z$. Thus an increase in $i_b$ would result in a much larger decrease and vice versa. Consequently, $i_b$ remains at its steady state value. Since the transistor base current is very small compared to other currents we may say, for practical purposes, that $$i_b = 0, \quad i_5 = i_6, \quad i_7 = i_8 = i_2/2$$

Thus, in FIG. 4, $i_5$ and $i_6$ are equal and correspond to $i_1$ of FIG. 3, and $2ei_7$ and $2ei_8$ are equal and correspond to $ei_2$ of FIG. 3. Also, $i_9$ of FIG. 4 corresponds to $2fi_1$ of FIG. 3.

Now assume a signal current $i_x$ in the loop due to speech activity at the subscriber telset. $i_x$ flows through the terminating resistors to the inputs of M1 and M2. The base current $i_b$ is unaffected because $i_5$ and $i_6$ vary in phase with one another. Therefore, as in FIG. 3, a signal current $2fi_x$ flows in $r_1$ and the hybrid transimpedance from loop current $i_x$ to outgoing signal voltage $v_1$ is $2fr_1$. Conversely, a common mode current $i_c$ in the loop causes $i_5$ and $i_6$ to vary in opposite phase. Suppose the common mode current causes $i_5$ to increase by $i_c$. Then $i_6$ must decrease by $i_c$ and $i_b$ increases by $2bi_c$. Then $i_7$ increases and $i_8$ decreases by $2b\beta i_c$. Therefore the common mode current in the loop must be $i_c(1 + 4be\beta)$. That is, the common mode current in the terminating resistors is only a small fraction of the common mode current in the loop. The rest of the common mode current flows to the output terminals of M3 and M4. The small common mode currents in $i_5$ and $i_6$ substract from one another when $fi_5$ and $fi_6$ are combined at the output of M5. This is in marked contrast to FIG. 3 where all of the common mode current in the loop flowed in the terminating resistors.

In FIG. 3 the amount of common mode current which the hybrid can tolerate is determined by the DC current $i_1$ flowing through the terminating resistors. In FIG. 4 the amount of common mode current which the hybrid can tolerate is determined by the current $ei_2$ flowing at the outputs of M3 and M4. Since the latter current is typically double the former, the hybrid of FIG. 4 has the practical advantage that it can tolerate higher levels of common mode current in the loop.

It is not necessarily true that the hybrid of FIG. 4 will provide a higher degree of suppression of common mode currents than the hybrid of FIG. 3. If the paths, Q1, M3 and Q2, M6, M4 are not well matched then the common mode currents in $2ei_7$ and $2ei_8$ are unequal. This causes the common mode currents in the two terminating resistors to be unequal and they do not cancel when combined substractively at the output of M5. Therefore the requirement for good common mode suppression in the hybrid of FIG. 4 is good matching of Q1, M3 versus Q2, M6, M4.

In the hybrid of FIG. 4 the description of transmission of incoming signals to the loop is essentially similar to that for the hybrid of FIG. 3.

An incoming signal applied to terminal 32 causes a signal current component $i_y$ in $i_2$. Current $i_y$ splits equally between Q1 and Q2 so that the signal inputs to M3 and M6 are each $1_y/2$ and the output current of M3 and M4 is $ei_y$, as in FIG. 3. The mechanism for signal balance is the same as already described for FIG. 3. Therefore the requirement for signal balance, the hybrid transconductance from input voltage to loop signal current, and the input impedance at terminal 32 are the same as for FIG. 3.

Figure 5:
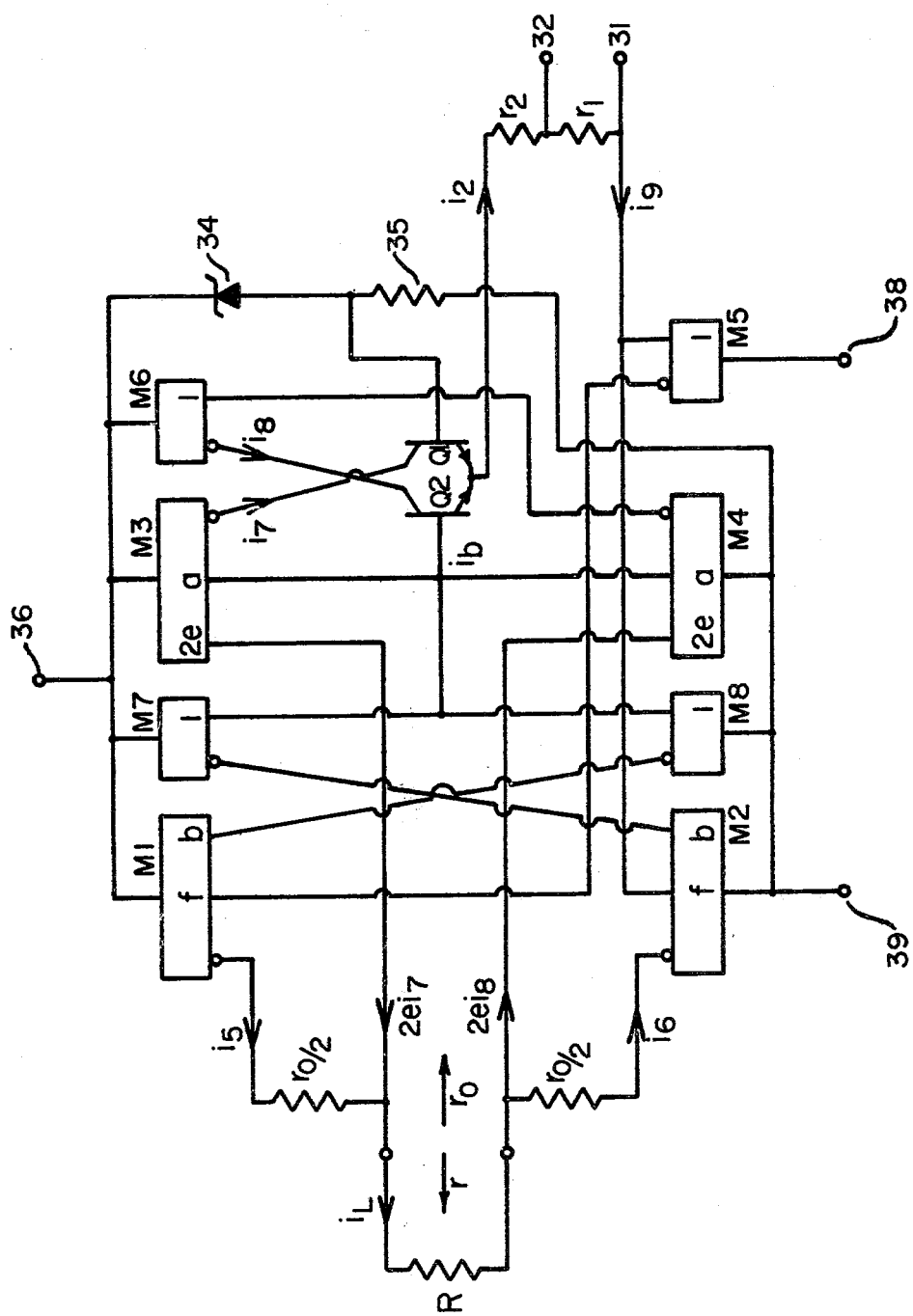
FIG. 5 shows a transformerless hybrid circuit in accordance with still another embodiment of the invention.

FIG. 5 shows still another hybrid in accordance with the present invention. It is very similar to the hybrid of FIG. 4 and corresponding terminals and currents are so indicated. FIG. 5 includes additional current mirrors M7 and M8 which simply repeat the outputs $bi_5$ and $bi_6$ of M1 and M2, and second outputs from current mirrors M3 and M4 which provide currents $ai_7$ and $ai_8$. The output terminals of M7 and M8 and the second outputs of M3 and M4 are all connected to the base of Q2, whereby the base current is $$i_b = b(i_6 - i_5) + a(i_7 - i_8)$$

As in FIG. 4, the loop current is $$i_L = i_5 + 2ei_7 = i_6 + 2ei_8$$

Therefore, $$i_6 - i_5 = 2e(i_7 - i_8)$$

and the base current is $$i_b = (2eb + a)(i_7 - i_8)$$

This arrangement forces $i_7 = i_8$ by the following mechanism. Suppose that $i_b$ increases by $i_z$. Then $i_8$ increases and $i_7$ decreases by $\beta i_z$ where $\beta$ is the current gain of Q2. Then $i_7 - i_8$ decreases by $(2eb + a)2\beta i_z$. Thus, an increase in $i_b$ would result in a much larger decrease and vice versa. Consequently, $i_b$ remains at its steady state value. Since the transistor base current is very small compared to other currents we may say, for practical purposes, that $i_b=0$, $i_5=i_6$, $i_7=i_8=i_2/2$ Thus in FIG. 6, $i_5$ and $i_6$ are equal and correspond to $i_1$ of FIG. 3, and $2ei_7$ and $2ei_8$ are equal and correspond to $ei_2$ of FIG. 3. Also $i_9$ of FIG. 5 corresponds to $2fi$ of FIG. 3.

The transmission of signal currents through the hybrid of FIG. 5 is exactly the same as for FIG. 4. Such signal currents are normal mode and cause $i_5$ and $i_6$ to vary in phase with one another, and $i_7$ and $i_8$ to vary in phase with one another. Therefore, $i_b$ is not affected by normal mode signals.

The suppression of common mode currents in FIG. 5 is slightly different from that in FIG. 4. Suppose in FIG. 5 that common mode current originating in the bidirectional signal path causes $i_5$ to increase and $i_6$ to decrease. Recall that $$i_b = b(i_6 - i_5) + a(i_7 - i_8)$$

Therefore $i_b$ tends to decrease but this causes $i_8$ to decrease and $i_7$ to increase. This common mode current in $i_7$ and $i_8$ tends to increase $i_b$. The net effect is that the common mode current in $i_7$, $i_8$ cancels the common mode current in $i_5$, $i_6$ in order to maintain $i_b$ very nearly zero. Thus, if the common mode current in $i_5$ is $i_c$, then the resulting common mode current in $i_7$ is $i_d$ where $$-2bi_c + 2ai_d = 0$$

Therefore $i_d = (b/c) i_c$ and the total common mode current in the bidirectional loop is $(1 + (2eb/a)) i_c$.

In the hybrid of FIG. 3 all of the common mode current in the loop flows through the terminating resistors. In the hybrid of FIG. 4 almost all of the common mode current in the loop flows to the outputs of current mirrors M3 and M4. In the hybrid of FIG. 5 the common mode current in the loop splits into two components, one of which flows through the terminating resistors and the other of which flows to the outputs of current mirrors M3 and M4. Therefore, the hybrid of FIG. 5 can accommodate greater magnitudes of common mode current in the bidirectional loop. This capacity is maximized by forcing the two common mode current components to be in the same proportion as the direct currents in the same paths. The direct currents are $i_5$ and $2ei_7 = 2efi_5$. The common mode currents are $i_c$ and $2eb/a$ $i_c$. Therefore, choosing $a = b/f$ maximizes the capacity of the FIG. 5 hybrid to accommodate common mode current in the bidirectional loop. The common mode currents in $i_5$ and $i_6$ subtract from one another when $fi_5$ and $fi_6$ are combined at the output of current mirror M5.

Figure 6:
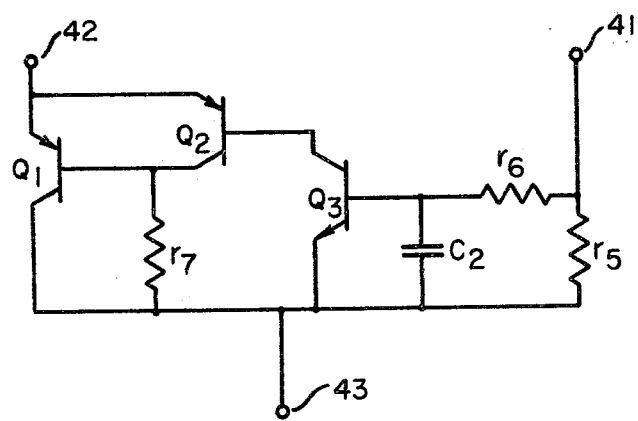
FIG. 6 is a circuit diagram of a current limiting circuit which may be employed with the hybrid circuits of FIGS. 3, 4 or 5.

Without current limiting the DC loop current $i_L$ in FIGS. 3, 4 and 5 may be unreasonably large for short loops where R is small. A suitable current limiting circuit is shown in FIG. 6 and is adapted to have its terminals 41 and 42 connected to the common terminals 38 and 39 of FIGS. 3, 4 or 5. The negative supply voltage is connected to terminal 43. The current limiting circuit prevents $i_L$ from exceeding a predetermined value. The current in the common lead 38 of M5 is $2fi_1$ which is proportional to $i_L$. Resistor $r_5$ is chosen such that when $i_L$ exceeds the desired value (say 30 ma) the voltage $2fi_1r_5$ exceeds the conduction threshold of transistor Q3 and causes it to conduct. For long loops transistor Q3 is non-conducting, transistor Q2 is non-conducting and transistor Q1 functions as a diode because its base is connected to its collector through resistor $r_7$. For short loops, Q3 conducts and Q2 conducts and diverts current from Q1 to $r_7$. Now Q1 functions as an emitter follower and the voltage v between the input terminals of M1 and M2 is reduced by the voltage across $r_7$. The decrease in v reduces $i_L$. Thus, any increase in $i_L$ above its nominal value causes a decrease in v which tends to decrease $i_L$. This control is very stiff because the current gain from $r_5$ to $r_7$ is the product of the current gains of Q2 and Q3. Resistor $r_6$ and capacitor C2 provide low pass filtering at the input to Q3 so that the limiting circuit controls only the DC current and does not respond to signal variations. Note that Q1 functions either as a diode or as an emitter follower. In either case the impedance in the common lead of M2 is very small so there is no appreciable effect on the input impedance of M2. Resistor $r_5$ increases the input impedance of M5 but that is of no consequence because M5 is driven from a high impedance source.

Referring again to FIGS. 3, 4 and 5, it is noted that each of these hybrid circuits includes a pair of terminating resistors ($r_0/2$) on the loop side, two resistors ($r_1$ and $r_2$) on the unidirectional side, current mirrors M1, M2, and M5 to convey signals from loop to outgoing terminal 31, and current mirrors M3 and M4 to convey signals from incoming terminal 32 (via resistor $r_2$) to the loop. The hybrid circuits differ with respect to the manner in which incoming signals (from $r_2$) and common mode signals are applied to the input terminals of current mirrors M3 and M4.

Each hybrid includes a driving circuit connected between $r_2$ and the input terminals of M3 and M4.

In FIG. 3 the driving circuit includes the connection from $r_2$ to the input of M3, and the second output of M3 which connects to the input of M4.

In FIG. 4 the driving circuit includes transsistors Q1 and Q2, current mirror M6, a reference voltage, second outputs of current mirrors M1 and M2, and their interconnections.

In FIG. 5 the driving circuit includes transsistors Q1 and Q2, current mirror M6, a reference voltage, second outputs of current mirrors M1 and M2, additional current mirrors M7 and M8, second outputs of current mirrors M3 and M4, and their interconnections.

The foregoing discussion of the functional operation of the hybrid circuits of FIGS. 3 and 4 can be conveniently recast in terms of current pairs having normal mode and common mode components. There are three current pairs on the loop side of the hybrid; one pair being the two currents which flow in the two loop conductors, and another pair being the two currents which flow through the two loop-side terminating resistors ($r_0/2$) and the input terminals of M1 and M2. The third current pair is the difference of the first and second pairs.

This viewpoint is adopted in FIGS. 7, 8 and 9, in which the three current pairs are labelled $j_L, j_{L'}$; $j_1, j_{1'}$ and $j_2, j_{2'}$, respectively. Each current pair $j, j'$ may be expressed in terms of a normal mode component $j_n$ and a common mode component $j_c$ defined by $$j_n = (1/2)(j + j')$$

$$j_c = (1/2)(j - j')$$

FIG. 7 is a functional representation of the hybrid circuit of FIG. 3. Circuit block A1 represents the combination of current mirrors M1, M2 and M5 having two input currents (shown as $i_1, i_1$ in FIG. 3) and output current $j_3$ (shown as $2fi_1$ in FIG. 3). Circuit block B1 represents the combination of current mirrors M3, M4 having input current $j_4$ (shown as $i_2$ in FIG. 3) and output currents $j_2,j_{2'}$ (shown as $ei_2$, $ei_{2'}$ in FIG. 3).

The function of block A1 is to provide an output current which is proportional to the normal mode component of its input current pair and independent of the common mode component of its input current pair. That is $j_3=k_1j_{n1}$. The function of block B1 is to provide an output current pair in which the normal mode component is proportional to the input current and the common mode component is zero. That is $$j_{n2}=k_2j_4 \text{ and } j_{c2}=0$$

FIG. 8 is a functional representation of the hybrid circuit of FIG. 4. Circuit block A2 represents the combination of current mirrors M1, M2 and M5 having two input currents $j_1,j_{1'}$ (shown as $i_5,i_6$ in FIG. 4) and two output currents $j_3$ (shown as $i_9$ IN FIG. 4) and $j_x$ (shown as $i_b$ in FIG. 4). Circuit block B2 represents the combination of current mirrors M3, M4 and M6 and transistors Q1 and Q2 having input currents $j_4$ (shown as $i_2$ in FIG. 4) and $j_y$ (shown as $i_b$ in FIG. 4) and output currents $j_2,j_{2'}$ (shown as $2ei_7$, $2ei_8$ in FIG. 4).

The function of block A2 is to provide an output current $j_3$ proportional to the normal mode component of its input current pair and an output current $j_x$ which is proportional to the common mode component of its input current pair. That is $$j_3=j_1j_{n1} \qquad j_x=k_3j_{c1}$$

The function of block B2 is to provide an output current pair in which the normal mode component is proportional to input current $j_4$ and the common mode component is proportional to input current $j_y$. That is $$j_{n2}=k_2j_4 \qquad j_{c2}=k_4j_y$$

In FIGS. 7 and 8 $j_L=j_i+j_2$ and $j_{L'}=j_{1'}+j_{2'}$. Adding and subtracting yields $j_{nL}=j_{n1}+j_{n2}$ and $j_{cL}=j_{c1}+j_{c2}$. Now assume a common mode (longitudinal) current $j_{cL}$ originating in the loop. For FIG. 7, $j_{c2}=0$ so $j_{c1}=j_{cL}$. For FIG. 8, $$j_{c2}=k_4j_y=k_4j_x=k_3k_4j_{c1}$$

so $j_{c1}=1/1+k_3k_4j_{cL}$ and $j_{c2}=k_3k_4/1+k_3k_4j_{cL}$

That is, in FIG. 7 all of $j_{cL}$ flows in $j_{c1}$, whereas in FIG. 8 $j_{cL}$ divides between $j_{c1}$ and $j_{c2}$ in the proportions calculated above. In either case the common mode currents flowing within the hybrid circuit are superimposed on direct currents, and the total instantaneous currents must remain positive. This requirement limits the magnitude of the common mode (longitudinal) current which the hybrid can accept from the loop. FIG. 8 provides a greater longitudinal capacity because the loop longitudinal flows in two paths rather than one.

It is a further object of the invention to provide a hybrid circuit which can accommodate longitudinal loop currents whose peak value exceeds the direct loop current.

This objective is achieved by the hybrid circuit shown in FIG. 9 in which circuit block A2 is identical to that shown in FIG. 8; circuit block B1 is identical to that shown in FIG. 7; and circuit block C is a functional representation of the circuit shown schematically in FIG. 10.

In FIG. 9, circuit A2 is functionally identical to circuit A2 of FIG. 8. It provides two separate output currents, $j_3$ proportional to the normal mode component, and $j_x$ proportional to the common mode component of the input current pair. Specifically:

$$j_3=k_1j_{n1} \qquad j_x=k_3j_{c1}$$

In FIG. 9, circuit B1 is functionally identical to circuit B1 of FIG. 7. Its output current pair has been relabelled $j_5,j_{5'}$. Circuit B provides an output current pair in which the normal mode component is proportional to the input current and the common mode component is zero. Specifically:

$$j_{n5}=k_2j_4 \qquad j_{c5}=0$$

In FIG. 9, circuit C has input current $j_y$ and output current pair $j_6,j_{6'}$. The function of circuit C is to provide an output current pair in which the common mode component is proportional to the input current and the normal mode component is zero. Specifically:

$$j_{c6}=k_4j_y \qquad j_{n6}=0$$

In FIG. 9

$$j_2=j_5+j_6 \qquad j_{2'}=j_{5'}+j_{6'}$$

Therefore $$j_{n2}=j_{n5}+j_{n6}=k_2j_4$$

$$j_{c2}=j_{c5}+j_{c6}=k_4j_y$$

These last two equations are identical to those for circuit B2 of FIG. 8. Therefore, as in FIG. 8, a common mode current $j_{cL}$ originating in the loop divides between $j_{c1}$ and $j_{c2}=j_{c6}$ in the proportions $$j_{c1}=\frac{1}{1+k_3k_4}j_{cL} \qquad j_{c6}=\frac{k_3k_4}{1+k_3k_4}j_{cL}$$

If $k_3k_4$ is much larger than unity $j_{c6}\cong j_{cL}$ and practically all of $j_{cL}$ flows in $j_{c6}$. Very little flows in $j_{c1}$. The advantage of FIG. 9 over FIG. 8 is that the common mode capacity of circuit C of FIG. 9 is much greater than the common mode capacity of circuit B2 of FIG. 8. In circuit B2 of FIG. 8 the common mode component $j_{c2}$ flows through current mirrors M3 and M4 together with normal mode direct currents and signal currents. The total instantaneous currents through these current mirror circuits must remain positive. Therefore, the magnitude of $j_{c2}$ is limited accordingly. In FIG. 9 this limitation is removed by providing $j_{c2}$ from a separate circuit C instead of from circuit B2. Circuit C is shown schematically in FIG. 10. Its input current is $j_y$ and its output current pair is $j_6,j_{6'}$. The emitters of transistors Q1 and Q2 are connected to any convenient reference voltage source. If $j_y$ is positive Q1 is conducting, Q2 non-conducting. Therefore, Q3 and Q4 are conducting, Q5 and Q6 non-conducting. $j_6$ is the collector current of Q4 and $-j_{6'}$ is the collector current of Q3. Assume that Q3 and Q4 and their emitter resistors are matched for equal collector currents. Then $-j_{6'}=j_6$ and $j_6$ is positive.

If $j_y$ is negative Q2 is conducting, Q2 is non-conducting. Therefore, Q5 and Q6 are conducting, Q3 and Q4 non-conducting. $j_{6'}$ is the collector current of Q5 and $-j_6$ is the collector current of Q6. Assume that Q5 and Q6 and their emitter resistors are matched for equal collector currents. Then $j_{6'} = -j_6$ and $j_6$ is negative.

In either case, $j_{6'} = -j_6$. Therefore, $j_{n6} = 0$. Note that this statement depends only on the match of Q3 to Q4, and Q5 to Q6. It does not require a matching of Q1 to Q2, or a matching of pair Q3,Q4 to pair Q5,Q6. Note also that $j_6$ has the same sign as $j_y$. It may be positive or negative and is not limited in magnitude, as was $j_{c2}$ supplied by circuit B2 in FIG. 8. Therefore, the hybrid circuit of FIG. 9 has a much greater longitudinal capacity than the hybrid circuits of FIGS. 7 or 8.

$j_6$ will be roughly proportional to $j_y$ so we can write $j_{c6} = k_4 j_y$ recognizing that $k_4$ may depend on instantaneous current levels, but is always positive. In particular, a mismatch between Q1 and Q2, or between pair Q3,Q4 and pair Q5,Q6 will cause non-linear distortion between $j_y$ and $j_{c6}$ which can be expressed as a variation of $k_4$ versus current level. But regardless of this, it remains true that $j_{n6} = 0$ and $j_{c6} = j_6$.

With $k_3 k_4$ large, $j_{c6}$ is very nearly equal to $j_{cL}$ regardless of variations in $k_4$. That is, non-linear distortion generated in circuit C has practically no effect on the longitudinal capacity of the hybrid. The distortion products do appear in $j_{c1}$ but this is of no consequence because $j_{c1}$ is very small and has no effect on the operation of the hybrid circuit with respect to normal mode components.

Finally, consider the current $j_z$ flowing to and from the emitters of Q1 and Q2. Obviously $j_z$ has the same sign as $j_y$. Typically, common mode currents in the loop are predominantly alternating currents, so $j_y$ and $j_z$ are predominantly alternating currents. The condenser provides a convenient low impedance path to ground for the alternating component of $j_z$ so that it need not flow through the reference voltage source. The direct current component of $j_z$ (if any) does flow through the reference voltage source.

It is obvious that FIG. 9 can be modified by replacing block B1 by block B2 of FIG. 8 and arranging the common mode output $j_x$ of block A2 to drive both the input of block C and the common mode input of block B2. This modification would provide a commom mode component $j_{c5}$ such that $$j_{c2} = j_{c5} + j_{c6}$$

Although the hybrid circuits of FIGS. 7, 8 and 9 operate differently with respect to commom mode currents, they operate identically with respect to normal mode currents. The performance for normal mode signals or currents is determined solely by the input-output network connected between the normal mode output terminal of block A1 or A2 and the normal mode input terminal of block B1 or B2. The input-output network shown in FIGS. 7, 8 and 9 is the same as shown in FIG. 3. Thus, the following analysis is merely a generalization of results already derived from FIG. 3. After obtaining generalized results we will substitute a different input-output network, as shown in FIG. 11, to obtain a hybrid circuit with somewhat different normal mode performance.

For the input-output network of FIGS. 7, 8 and 9 assume, as in FIG. 3, that the output terminal drives the very high impedance input terminal of an output amplifier, and that the input terminal is driven by the very low impedance output terminal of an input amplifier. Then, for direct currents, there is unity transmission from $j_3$ to $j_4$ but, for signal currents, there is zero transmission from $j_3$ to $j_4$.

For direct currents $$j_{n2} = k_2 j_4 = k_2 j_3 = k_1 k_2 j_{n1}$$

Consequently $$j_{n1} = \frac{1}{1 + k_1 k_2} j_{nL} \quad j_{n2} = \frac{k_1 k_2}{1 + k_1 k_2} j_{nL}$$

That is, the direct current in the loop is supplied partly from the low impedance input terminals of circuit A1 or A2 (via $r_o$) and partly from the high impedance output terminals of circuit B1 or B2 in the proportions calculated above. Consequently, the DC feed resistance of the hybrid circuit, as seen by the loop, is $$r_f = (r_o/1 + k_1 k_2)$$

Conversely, because there is no signal transmission from $j_3$ to $j_4$, the signal impedance of the hybrid circuit, as seen by the loop, is simply $r_h = r_o$.

Thus, the two loop-side terminating resistors must each be one-half of the specified hybrid signal impedance.

For a signal current $j_t$ originating in the loop we have $$j_{nL} = j_t$$

$j_t$ flows in $j_1, j_{1'}$ but not in $j_2, j_{2'}$. Therefore $$j_{n1} = j_t \quad j_3 = k_1 j_t$$

and the output signal voltage is $$v_1 = k_1 j_t r_1$$

Let $v_2$ be the voltage at the input terminal caused by an incoming signal. Then $$j_4 = -v_2/r_2 \text{ and } j_{n2} = k_2 j_4$$

Let the signal impedance of the loop be r. Then $j_{n2}$ divides between the loop and the terminating resistors in the proportion $$j_{nL} = j_{n2}\left(\frac{r_o}{r_o + r}\right) \quad j_{n1} = -j_{n2}\left(\frac{r}{r_o + r}\right)$$

Then $$j_3 = k_1 j_{n1} = -\left(\frac{k_1 r}{r_o + r}\right) j_{n2} = +\frac{k_1 k_2}{r_2}\left(\frac{r}{r_o + r}\right) v_2$$

and the voltage at the output terminal is $$v_1 = v_2 - j_3 r_1 = v_2 \left[ 1 - k_1 k_2 \frac{r_1}{r_2}\left(\frac{r}{r_o + r}\right) \right]$$

$v_1$ is an outgoing "echo" of the incoming signal $v_2$, and should be suppressed. It is suppressed (i.e. $v_1=0$) if $r_2$ has the particular value $$r_2 = k_1 k_2 r_1 \left( \frac{r}{r_o + r} \right)$$

Thus, $r_2$ should be chosen to "balance" the signal impedance of the loop.

The loop current is $$i_{nL} = \frac{-k_2 v_2}{r_2} \left( \frac{r_o}{r_o + r} \right)$$

With $r_2$ chosen as above, $$i_{nL} = \frac{-v_2 r_o}{k_1 r_1 r}$$

and the voltage gain from input to loop is $$\frac{j_{nL} r}{v_2} = -\frac{r_o}{k_1 r_1}$$

The foregoing results are readily generalized to loops of complex signal impedance. That is, let the loop impedance be $z$ (rather than $r$) and replace $r_2$ by $z_2$. Then $$j_4 = -\frac{v_2}{z_2} \quad j_{nL} = j_{n2}\left(\frac{r_o}{r_o + z}\right) \quad j_{n1} = -j_{n2}\left(\frac{z}{r_o + z}\right)$$

and we find that to suppress the outgoing echo of the incoming signal we need $$z_2 = k_1 k_2 \frac{r_1}{r_o} \left( \frac{r_o z}{r_o + z} \right)$$

The complex impedance $z_2$ is conveniently realized as a fixed resistor $$r_b = k_1 k_2 r_1$$

in parallel with a "balance" impedance $$z_b = (r_b/r_o)z$$

That is, the balance impedance is simply a scaled equivalent of the complex loop impedance. The loop current is $$j_{nL} = \frac{-k_2 v_2}{z_2} \left( \frac{r_o}{r_o + z} \right)$$

with $z_2$ chosen as above $$j_{nL} = \frac{-v_2 r_o}{k_1 r_1 z}$$

and the voltage gain from input to loop is $$\frac{j_{nL} z}{v_2} = -\frac{r_o}{k_1 r_1}$$

It is important to note that if the balance impedance is chosen to match the loop impedance, the voltage gain from input to loop is independent of the loop impedance. Conversely, in conventional transformer-type hybrids the voltage gain from input to loop is dependent on the loop impedance. That is, for a conventional hybrid the voltage gain from input to loop is proportional to $$(z/r_h + z)$$

where $z$ is the loop impedance and $r_h$ is the hybrid impedance. This result is independent of the balance network in conventional hybrids.

It is a further object of the invention to provide a hybrid circuit in which the loop side terminating resistors can each be much larger than one-half the specified loop-side hybrid signal impedance. It is a further object of the invention to provide a hybrid circuit in which the voltage gain from input to loop conforms to that for conventional transformer-type hybrids and is independent of the balance impedance of the hybrid.

These two objectives are achieved by substituting in FIGS. 7, 8 or 9 the input-output network shown schematically in FIG. 11.

In FIG. 11 condensers C1 and C2 are DC blocking condensers. C1 connects to the low impedance input terminal (virtual ground) of an output amplifier and C2 connects to the low impedance output terminal of an input amplifier. It is obvious from the structure of the network that, for direct currents, $j_4=j_3$. Consequently, as before, the DC feed resistance of the hybrid, as seen by the loop, is $$r_f = r_o/1 + k_1 k_2$$

Recall that the input terminal of block B1 or B2 is a low impedance point. Therefore, for signal currents, $i_3$ divides into $$j_7 = k_5 j_3 \text{ and } j_8 = (1-k_5)j_3$$

where $$k_5 = r_3/r_1 + r_3$$

The incoming signal current is $j_9 = (V_2/r_2)$

The input current to block B1 or B2 is $j_4 = j_7 - j_9$.

The signal output currents is $j_8 - j_{10}$ where $j_{10}$ depends on $v_2$ and serves to suppress outgoing echoes of the incoming signals.

Recall that $$j_3 = k_1 j_{n1}, \quad j_{n2} = k_2 j_4 \text{ and } j_{nL} = j_{n1} + j_{n2}$$

Combining the foregoing equations yields $$j_{n1} = h j_{nL} + k_2 j_9$$

$$j_{n2} = (1-h) j_{nL} - k_2 j_9$$

where $h = (1/1 + k_1 k_2 k_5)$

Now assume $v_2=0$ and a signal current $j_l$ originating in the loop, i.e. $j_9=0$, $j_{10}=0$, $j_{nL}=j_l$. Then $j_{n1}=hj_l$ and the output signal current is $j_8 = k_1(1-k_5)j_l$. The signal voltage at the loop terminals is $j_{n1}r_o = hr_o j_t$ so the signal impedance of the hybrid, as seen by the loop is $$r_h = hr_o$$

If h is small $r_o$ can be much larger than $r_h$. Also note that $r_f < r_h$ because $k_5 < 1$. The condition $r_f < r_h$ conforms to general practice.

Now assume an input signal $v_2$. Then $$j_{n2} = (1 - h)j_{nL} - k_2 \frac{v_2}{r_2}$$

The portion of $j_{n2}$ which flows in the loop (of complex impedance z) is $$j_{nL} = \left(\frac{r_0}{r_0 + z}\right) j_{n2}$$

Combining these yields $$j_{nL} = -\frac{k_2 r_0}{r_2}\left(\frac{v_2}{r_h + z}\right)$$

so the voltage gain from input to loop is $$\frac{j_{nL} z}{v_2} = -\frac{k_2 r_0}{r_2}\left(\frac{z}{r_h + z}\right)$$

This expression is independent of $j_{10}$ and provides the same variation with loop impedance as for a conventional transformer type hybrid.

The input signal $v_2$ generates a corresponding outgoing echo signal in $j_8$, which is to be suppressed by $j_{10}$. The outgoing echo is $$j_8 = k_1(1-k_5)j_{n1}$$

But $$j_{n1} = hj_{nL} + k_2(v_2/r_2)$$

Therefore $$j_8 = \frac{K}{r_2}\left(\frac{z}{r_h + z}\right)v_2 \text{ where } K = k_1 k_2(1-k_5)$$

To suppress this outgoing echo we need $j_{10} = j_8$ In many practical applications the complex impedance of a subscriber loop can be adequately similated by the parallel combination of a resistor r and a capacitor C in which case $$z = r/1 + prC$$

where p is the complex frequency variable.
Then $$\frac{z}{r_h + z} = \frac{r}{r + r_h + prr_hC}$$

In FIG. 11, $$i_{10} = \frac{v_2}{r_4 + r_5 + pr_4 r_5 C_3}$$

Therefore, we can make $j_{10} = j_8$ by choosing $$r_4 = \frac{r_2}{K} \ r_5 = \frac{r_h r_4}{r} \text{ and } C_3 = \frac{r}{r_4} C$$

In some applications it may be desirable to use a more precise simulation of the complex loop impedance. In such cases the network of FIG. 12 can be substituted for $r_4$, $r_5$, $C_3$ of FIG. 11. In FIG. 12

$$j_{10} = j_8 \text{ for}$$

$$r_6 = \frac{r_2}{2K} \text{ and } z_6 = \frac{r_6}{2r_h} z$$

$z_6$ can be any complex network simulating the loop impedance z. If $z_6$ does not include series capacitance it may be necessary to add a DC blocking condenser in series $z_6$.

FIG. 13 is a complete schematic diagram of the hybrid circuit shown functionally in FIG. 9, but using the input-output network of FIG. 11.

What is claimed is:

1. A direct coupled hybrid circuit for providing signal conversion between a balanced bidirectional transmission path and a pair of unbalanced unidirectional transmission paths, said pair including an incoming and an outgoing transmission path, said hybrid circuit comprising:
   first and second loop terminals adapted to be coupled to said bidirectional transmission path;
   first and second unidirectional terminals adapted to be coupled to said outgoing and said incoming unidirectional transmission paths, respectively;
   a first plurality of current mirror circuit means of a first conductivity type;
   a second plurality of current mirror circuit means of an opposite conductivity type;
   each of said current mirror circuit means having an input terminal, one or more output terminals, a common terminal and means for supplying currents to said output terminals which are proportional to the current at said input terminal;
   the input terminal of the first one of each of said first and second plurality of current mirror circuit means being coupled to said first and second loop terminals, respectively, via first and second impedance elements;
   a first output terminal of the second one of each of said first and second plurality of current mirror circuit means being coupled to said first and second loop terminals respectively;
   a first output terminal of the first one of said first plurality of current mirror circuit means being coupled to the input terminal of a third one of said second plurality of current mirror circuit means;
   a first output terminal of the first and third ones of said second plurality of current mirror circuit means being coupled to the first unidirectional terminal;
   a third impedance element connected between the first and second unidirectional terminals;

a fourth impedance element connected between the second unidirectional terminal and the input terminal of the second one of said first plurality of current mirror circuit means; and a second output of the second one of said first plurality of current mirror circuit means being coupled to the input terminal of the second one of said second plurality of current mirror circuit means.

2. A direct coupled hybrid circuit as in claim 1 in which said third and fourth impedance elements are resistors $r_1$ and $r_2$ respectively wherein $r_2 = efr_1$ where e is the ratio of current at the first output terminal of said second one of either said first or said second plurality of current mirror circuit means to current in said fourth impedance element, and f is the current gain at the first output terminal of said first one of either said first or said second plurality of current mirror circuit means.

3. A direct coupled hybrid circuit as in claim 1 including a current limiting circuit having three terminals, one connected to the supply voltage, one connected to the common terminal of the first one of either the first or second plurality of current mirror circuit means, and one connected to the common terminal of one other current mirror circuit means.

4. A direct coupled hybrid circuit for providing signal conversion between a balanced bidirectional transmission path and a pair of unbalanced unidirectional transmission paths, said pair including an incoming and an outgoing transmission path, said hybrid circuit comprising:

first and second loop terminals adapted to be coupled to said bidirectional transmission path;

first and second unidirectional terminals adapted to be coupled to said outgoing and said incoming unidirectional transmission paths, respectively;

a first plurality of current mirror circuit means of a first conductivity type;

a second plurality of current mirror circuit means of an opposite conductivity type;

each of said current mirror circuit means having an input terminal, one or more output terminals, a common terminal and means for supplying currents to said output terminals which are proportional to the current at said input terminal;

first and second transistors each having collector, base and emitter terminals, the emitter terminals of said transistors being connected together and the base of said second transistor being connected to a reference voltage, the input terminal of the first one of each of said first and second plurality of current mirror circuit means being coupled to said first and second loop terminals, respectively, via first and second impedance elements;

a first output terminal of the second one of each of said first and second plurality of current mirror circuit means being coupled to said first and second loop terminals respectively;

a first output terminal of the first one of said first plurality of current mirror circuit means being coupled to the input terminal of a third one of said second plurality of current mirror circuit means;

a first output terminal of the first and third ones of said second plurality of current mirror circuit means being coupled to the first unidirectional terminal;

a third impedance element connected between the first and second unidirectional terminals;

a fourth impedance element being coupled between said second unidirectional terminal and the emitter terminals of said first and second transistors;

a second output terminal of the first one of each of said first and second plurality of current mirror circuit means being connected together and to the base terminal of said first transistor;

the collector terminal of said first transistor being coupled to the input terminal of the second one of said first plurality of current mirror circuit means;

the collector terminal of said second transistor being coupled to the input terminal of the third one of said first plurality of current mirror circuit means; and a first output terminal of the third one of said first plurality of current mirror circuit means being coupled to the input terminal of the second one of said second plurality of current mirror circuit means.

5. A direct coupled hybrid circuit as in claim 4 in which said third and fourth impedance elements are resistors $r_1$ and $r_2$ respectively wherein $r_2 = efr_1$ where e is the ratio of current at the first output terminal of said second one of either said first or said second plurality of current mirror circuit means to current in said fourth impedance element, and f is the current gain at the first output terminal of said first one of either said first or said second plurality of current mirror circuit means.

6. A direct coupled hybrid circuit as in claim 4 including a current limiting circuit having three terminals, one connected to the supply voltage, one connected to the common terminal of the first one of either the first or second plurality of current mirror circuit means, and one connected to the common terminal of one other current mirror circuit means.

7. A direct coupled hybrid circuit for providing signal conversion between a balanced bidirectional transmission path and a pair of unbalanced unidirectional transmission paths, said pair including an incoming and an outgoing transmission path, said hybrid circuit comprising:

first and second loop terminals adapted to be coupled to said bidirectional transmission path;

first and second unidirectional terminals adapted to be coupled to said outgoing and said incoming unidirectional transmission paths, respectively;

a first plurality of current mirror circuit means of a first conductivity type;

a second plurality of current mirror circuit means of an opposite conductivity type;

each of said current mirror circuit means having an input terminal, one or more output terminals, a common terminal and means for supplying currents to said output terminals which are proportional to the current at said input terminal;

first and second transistors each having collector, base and emitter terminals, the emitter terminals of said transistors being connected together and the base of said first transistor being connected to a reference voltage;

the input terminal of the first one of each of said first and second plurality of current mirror circuit means being coupled to said first and second loop terminals, respectively, via first and second impedance elements;

a first output terminal of the second one of each of said first and second plurality of current mirror circuit means being coupled to said first and second loop terminals respectively;

a first output terminal of the first one of said first plurality of current mirror circuit means being coupled to the input terminal of a third one of said second plurality of current mirror circuit means;

a first output terminal of the first and third ones of said second plurality of current mirror circuit means being coupled to the first unidirectional terminal;

a third impedance element connected between the first and second unidirectional terminals;

a fourth impedance element being coupled between said second unidirectional terminal and the emitter terminals of said first and second transistors;

a second output terminal of the first one of said first plurality of current mirror circuit means being connected to the input terminal of the fourth one of said second plurality of current mirror circuit means;

a second output terminal of the first one of said second plurality of current mirror circuit means being connected to the input terminal of the fourth one of said first plurality of current mirror circuit means;

a first output terminal of the fourth one of each of said first and second plurality of current mirror circuit means being connected together and to the base terminal of said second transistor;

a second output terminal of the second one of said each of first and second plurality of current mirror circuit means being connected together and to the base terminal of said second transistor;

the collector terminal of said first transistor being coupled to the input terminal of the second one of said first plurality of current mirror circuit means;

the collector terminal of said second transistor being coupled to the input terminal of the third one of said first plurality of current mirror circuit means; and a first output terminal of the third one of said first plurality of current mirror circuit means being coupled to the input terminal of the second one of said second plurality of current mirror circuit means.

8. A direct coupled hybrid circuit as in claim 7 in which said third and fourth impedance elements are resistors $r_1$ and $r_2$ respectively wherein $r_2 = efr_1$ where e is the ratio of current at the first output terminal of said second one of either said first or said second plurality of current mirror circuit means to current in said fourth impedance element, and f is the current gain at the first output terminal of said first one of either said first or said second plurality of current mirror circuit means.

9. A direct coupled hybrid circuit as in claim 7 including a current limiting circuit having three terminals, one connected to the supply voltage, one connected to the common terminal of the first one of either the first or second plurality of current mirror circuit means, and one connected to the common terminal of one other current mirror circuit means.

10. A direct coupled hybrid circuit providing signal transmission between balanced bidirectional signal path terminals and a pair of unidirectional signal path terminals, one incoming and one outgoing, including:

means in said circuit for receiving and converting normal mode signals incoming on the bidirectional signal path terminals to signals on the outgoing unidirectional signal path terminals;

means in said circuit for receiving and signals on the incoming unidirectional signal path terminals to normal mode signals outgoing on the bidirectional signal path terminals;

means in said circuit for suppressing the transmission of common mode signals incoming on the bidirectional signal path to the outgoing unidirectional signal path;

means in said circuit for suppressing the transmission of signals from the incoming unidirectional signal path to the outgoing unidirectional signal path;

means connected to said bidirectional signal path terminals for providing a hybrid impedance $Z_0$ to normal mode signals incoming or outgoing on the bidirectional signal path, said hybrid impedance being provided by two terminating impedances, each of value $Z_0/2$ and each having one terminal connected to one side of the bidirectional signal path; and means at said unidirectional signal path terminals for providing direct current to the bidirectional signal path, said current being comprised of two components, one component being supplied through said terminating impedances and the other component being supplied from the outputs of current controlled current sources in which said two components of direct current are in constant proportion to one another, the constant of proportionality being independent of the resistance of said terminating impedance or the direct current resistance of the bidirectional signal path.

11. A direct coupled hybrid circuit as in claim 10 in which all of the common mode currents incoming from the bidirectional signal path flow through said terminating impedances.

12. A direct coupled hybrid circuit as in claim 10 in which most of the common mode currents incoming from the bidirectional signal path flow to said current sources and only a small portion of said common mode currents flow through said terminating impedances.

13. A direct coupled hybrid circuit as in claim 10 in which the common mode currents incoming from the bidirectional signal path divide into two components in fixed proportion to one another, one of which flows through said terminating impedances and the other of which flows to said current sources.

14. A direct coupled hybrid circuit as in claim 13 in which said two components of common mode current are in the same proportion as the direct currents flowing in the corresponding circuit paths.

15. A direct coupled hybrid circuit as in claim 10 including current limiting means to prevent the direct current supplied to the bidirectional signal path from exceeding a predetermined value while allowing the hybrid circuit to remain functionally operative.

16. A direct coupled hybrid circuit providing signal transmission between balanced bidirectional signal path terminals and a pair of unidirectional signal path terminals, one incoming and one outgoing, including:

means in said circuit for receiving and converting normal mode signals incoming on the bidirectional signal path terminals to signals on the outgoing unidirectional signal path terminals;

means in said circuit for receiving and converting signals on the incoming unidirectional signal path terminals to normal mode signals outgoing on the bidirectional signal path terminals;

means in said circuit for suppressing the transmission of common mode signals incoming on the bidirectional signal path to the outgoing unidirectional signal path;

means in said circuit for suppressing the transmission of signals from the incoming unidirectional signal path to the outgoing unidirectional signal path;

means connected to said bidirectional signal path terminals for providing a hybrid impedance to normal mode signals incoming or outgoing on the bidirectional signal path, said hybrid impedance being provided by two terminating impedances, each having one terminal connected to one side of the bidirectional signal path; and means at said unidirectional signal path terminals for providing direct current to the bidirectional signal path, said current being comprised of two components, one component being supplied through said terminating impedances and the other component being supplied from the outputs of current controlled current sources in which said two components of direct current are in constant proportion to one another, the constant of proportionality being independent of the resistance of said terminating impedance or the direct current resistance of the bidirectional signal path.

17. A direct coupled hybrid circuit as in claim 16 which:

remains functionally operative when the longitudinal (common mode) current in said bidirectional signal path exceeds the value of the direct current in said bidirectional signal path.

18. A direct coupled hybrid circuit for providing signal conversion between a balanced bidirectional transmission path and a pair of unbalanced unidirectional transmission paths, said pair including an incoming and an outgoing transmission path, said hybrid circuit comprising:

first and second loop terminals adapted to be coupled to said bidirectional transmission path;

first and second unidirectional terminals adapted to be coupled to said outgoing and said incoming unidirectional transmission paths, respectively;

mode detecting circuit means having a pair of input terminals and a first output terminal, in which the output current is proportional to the normal mode component of the two input currents;

a first output circuit means having a first input terminal and a pair of output terminals, in which the normal mode component of the two output currents is proportional to the first input current;

coupling circuit means having four terminals;

the input terminals of said mode detecting circuit means being coupled to said loop terminals respectively via first and second impedance elements;

the output terminals of said first output circuit means being coupled to said loop terminals respectively;

the first and second terminals of said coupling circuit means being coupled to said first and second unidirectional terminals, respectively;

the first output terminal of said mode detecting circuit means being coupled to a third terminal of said coupling circuit means; and the first input terminal of said first output circuit means being coupled to a fourth terminal of said coupling circuit means.

19. A direct coupled hybrid circuit as in claim 18 in which said mode detecting circuit means has a second output terminal, in which the output current is proportional to the longitudinal component of the two input currents;

said first output circuit means has a second input terminal, in which the longitudinal component of the two output currents is proportional to said second input current;

said second output terminal of said mode detecting circuit means being coupled to said second input terminal of said first output circuit means, thereby increasing the magnitude of the longitudinal signal in the bidirectional path which the hybrid circuit can suppress.

20. A direct coupled hybrid circuit as in claim 18 in which:

said mode detecting circuit means has a second output terminal, in which the output current is proportional to the longitudinal component of the two input currents;

said hybrid circuit includes a second output circuit means having an input terminal and a pair of output terminals, in which the longitudinal (common mode) component of the two output currents is proportional to the input current;

the output terminals of said second output circuit means being coupled to said loop terminals respectively; and said second output terminal of said mode detecting circuit means being coupled to said input terminal of said second output circuit means, thereby providing a hybrid circuit which can suppress longitudinal currents in the bidirectional signal path whose magnitudes exceed the direct current in that path.

21. A direct coupled hybrid circuit as in claim 18 in which:

said coupling network provides direct current transmission from said first output terminal of said mode detecting circuit means to said first input terminal of said first output circuit means, thereby providing a direct current feed resistance to the bidirectional path which is less than the sum of said first and second impedance elements.

22. A direct coupled hybrid circuit as in claim 18 in which:

said coupling network provides signal transmission from said first output terminal of said mode detecting circuit means to said first input terminal of said first output circuit means, thereby providing a signal impedance to the bidirectional signal path which is less than the sum of said first and second impedance elements.

23. A direct coupled hybrid circuit as in claim 18 in which:

said coupling network includes means for suppressing signal transmission from said second to said first unidirectional terminal according to the signal impedance of said bidirectional signal path.

24. A direct coupled hybrid circuit as in claim 23 in which:

the signal transmission from said second unidirectional input terminal to said bidirectional signal path is independent of said means for suppressing signal transmission from said second to said first unidirectional terminal.

* * * * *